United States Patent [19]
Ovesjö et al.

[11] Patent Number: 6,108,369
[45] Date of Patent: Aug. 22, 2000

[54] CHANNELIZATION CODE ALLOCATION FOR RADIO COMMUNICATION SYSTEMS

[75] Inventors: Fredrik Ovesjö, Solna; Erik Dahlman, Bromma, both of Sweden

[73] Assignee: Telefonaktiebolaget LM Ericsson, Stockholm, Sweden

[21] Appl. No.: 08/890,793

[22] Filed: Jul. 11, 1997

[51] Int. Cl.[7] .............................. H04B 15/00; H04K 1/00; H04L 27/30
[52] U.S. Cl. ............................................................ 375/146
[58] Field of Search ................................. 375/200, 206; 370/320, 335, 342, 441

[56] References Cited

U.S. PATENT DOCUMENTS

| | | | |
|---|---|---|---|
| 5,544,156 | 8/1996 | Teder et al. | 370/18 |
| 5,559,788 | 9/1996 | Zscheile, Jr. et al. | 370/18 |
| 5,619,526 | 4/1997 | Kim et al. | 370/335 |
| 5,751,761 | 5/1998 | Gilhousen | 375/200 |
| 5,920,552 | 7/1999 | Allpress et al. | 370/335 |

FOREIGN PATENT DOCUMENTS

WO95/036 2/1995 WIPO.

*Primary Examiner*—Don N. Vo
*Assistant Examiner*—Phuong Phu
*Attorney, Agent, or Firm*—Burns, Doane, Swecker & Mathis, L.L.P.

[57] ABSTRACT

Variable spreading factors and multi-code transmissions are flexibly accommodated by assigning spreading codes in accordance with the described techniques. Spreading codes are assigned so that the control channel is orthogonal to all physical channels in the composite spread spectrum signal. Power balance between in-phase (I) and quadrature (Q) branches in the transmitter is also provided by assigning physical channels to appropriate branches and splitting physical channels, where necessary.

22 Claims, 4 Drawing Sheets

CHANNELIZATION CODE ALLOCATION FOR RADIO COMMUNICATION SYSTEMS

BACKGROUND

This invention generally relates to variable data rate transmissions and, more particularly, to techniques for efficiently allocating spreading codes for variable rate data transmissions.

Cellular radio communication systems have recently been developed that use spread spectrum modulation and code division multiple access (CDMA) techniques. In a typical direct sequence CDMA system, an information data stream to be transmitted is superimposed on a much-higher-symbol-rate data stream sometimes known as a spreading sequence. Each symbol of the spreading sequence is commonly referred to as a chip. Each information signal is allocated a unique spreading code that is used to generate the spreading sequence typically by periodic repetition. The information signal and the spreading sequence are typically combined by multiplication in a process sometimes called coding or spreading the information signal. A plurality of spread information signals are transmitted as modulations of radio frequency carrier waves and are jointly received as a composite signal at a receiver. Each of the spread signals overlaps all of the other coded signals, as well as noise-related signals, in both frequency and time. By correlating the composite signal with one of the unique spreading sequences, the corresponding information signal can be isolated and decoded.

As radiocommunication becomes more widely accepted, it will be desirable to provide various types of radiocommunication services to meet consumer demand. For example, support for facsimile, e-mail, video, internet access, etc. via radiocommunication systems is envisioned. Moreover, it is expected that users may wish to access different types of services at the same time. For example, a video conference between two users would involve both speech and video support. Some of these different services will require relatively high data rates compared with speech service that has been conventionally supplied by radio communication systems, while other services will require variable data rate service. Thus, it is anticipated that future radio communication systems will need to be able to support high data rate communications as well as variable data rate communications.

Several techniques have been developed to implement variable rate communications in CDMA radio communication systems. From the perspective of transmitting data at varying rates, these techniques include, for example, discontinuous transmission (DTX), variable spreading factors, multi-code transmission and variable forward error correction (FEC) coding. For systems employing DTX, transmission occurs only during a variable portion of each frame, i.e., a time period defined for transmitting a certain size block of data. The ratio between the portion of the frame used for transmission and the total frame time is commonly referred to as the duty cycle $\gamma$. For example, when transmitting at the highest possible rate, i.e., during the entire frame period, $\delta=1$, while for zero rate transmissions, e.g., during a pause in speech, $\delta=0$. DTX is used, for example, to provide variable data rate transmissions in systems designed in accordance with the U.S. standard entitled "Mobile Station-Base Station Compatibility Standard for Dual-Mode Wideband Spread Spectrum Cellular System", TIA/EIA Interim Standard TIA/EIA/IS-95 (July 1993) and its revision TIA/EIA Interim Standard TIA/EIA/IS-95-A (May 1995). Such standards that determine the features of U.S. cellular communication systems are promulgated by the Telecommunications Industry Association and the Electronic Industries Association located in Arlington, Va.

Varying the spreading factor is another known technique for providing variable data rate communication. As mentioned above, DS-CDMA spread spectrum systems spread data signals across the available bandwidth by multiplying each of the data signals with spreading sequences. By varying the number of chips per data symbol, i.e., the spreading factor, while keeping the chip rate fixed, the effective data rate can be controllably varied. In typical implementations of the variable spreading factor approach, the spreading factor is limited by the relationship to $SF=2^k=SF_{min}$ where $SF_{min}$ is the minimum allowed spreading factor corresponding to the highest allowed user rate.

Another known technique for varying the transmitted data rate is commonly referred to as multi-code transmission. According to this technique, data is transmitted using a variable number of spreading codes where the exact number of codes used depends on the instantaneous user bit rate. Effectively, this means allocating a variable number of physical channels to a connection to provide variable bandwidth. An example of multi-code transmission is described in U.S. Pat. application Ser. No. 08/636,648 entitled "Multi-Code Compressed Mode DS-CDMA Systems and Methods", filed on Apr. 23, 1996, the disclosure of which is incorporated here by reference.

Yet another technique for varying the transmitted data rate in radio communication systems involves varying the FEC. More specifically, the rate of the forward error correction (FEC) coding is varied by using code-puncturing and repetition or by switching between codes of different rates. In this way the user rate is varied while the channel bit rate is kept constant. Those skilled in the art will appreciate the similarities between varying the FEC and a variable spreading factor as mechanisms to implement variable rate transmission.

In both the uplink and downlink, it is desirable that any number of logical channels can be transmitted simultaneously to support a single connection between a base station and a mobile station to support various data rates. To transmit these logical channels over the radio interface, a number of physical channels are allocated. These physical channels are separated using different spreading codes (channelization codes), i.e., multicode transmission is used. Each physical channel can have one of several possible data rates, i.e., one of several possible spreading factors is used when spreading the data transmitted on the physical channel. To date, however, a flexible solution which allocates code words to physical channels taking into consideration the codes which have already been allocated to other channels and power considerations associated with the in-phase (I) and quadrature (Q) transmitter branches has not been provided.

Accordingly, it would be desirable to create new techniques and systems for allocating spreading codes in a flexible manner that supports multicode transmissions and variable spreading factors, and that optimizes power efficiency.

SUMMARY

These and other problems associated with previous communication systems are solved by Applicants' invention, wherein spreading codes are allocated for physical channels taking into consideration the spreading codes already allocated to other physical channels to be transmitted in parallel therewith. For example, if the physical channel being allocated a spreading code is a control channel (PCCH), then techniques according to the present invention investigate whether another physical channel on either the I or Q branches of the transmitter has already been assigned a spreading code so that the PCCH can be allocated a spreading code which makes the PCCH orthogonal to all other physical channels used in the composite spread spectrum signal. Moreover, for physical data channels (PDCH), techniques according to the present invention determine if any other channels have previously been assigned spreading codes on the same I or Q branch as the channel currently under investigation. If so, this PDCH is allocated a spreading code that makes the PDCH orthogonal to other PDCHs in the same branch, as well as to the PCCH.

According to other exemplary embodiments of the present invention, in addition to assigning a spreading code to each physical channel, the physical channels are also allocated between the I and Q branches of the transmitter in a manner intended to balance power between the two branches and improve power amplifier performance. For example, if the data rate associated with a connection to be set up is relatively low, then the connection may be supported by one PDCH and one PCCH, one of which is assigned to the I branch of the transmitter and the other to the Q branch. If, however, the data rate associated with a connection to be set up is relatively high, then assigning the PDCH to one branch and the PCCH to the other creates a large power discrepancy between the two branches. In such a case, the data can be transmitted on two PDCHs each of which are allocated to the I and Q branches of the transmitter, respectively, and the control channel can be allocated to either the I or Q branch.

BRIEF DESCRIPTION OF THE DRAWINGS

The features and objects of Applicants' invention will be understood by reading this description in conjunction with the drawings, in which.

DETAILED DESCRIPTION

While this description is written in the context of cellular communications systems involving portable or mobile radio telephones, it will be understood by those skilled in the art that Applicants' invention may be applied to other communications applications.

According to exemplary embodiments of the present invention, CDMA systems can support variable bit rate services, such as speech, by providing control information in each frame which specifies the instantaneous data symbol rate for that frame. In order to accomplish this in a regular time interval, physical channels can be organized in frames of equal length (timewise). Each frame carries an integer number of chips and an integer number of information bits.

Using this exemplary frame structure, bit rate control information can be provided for every CDMA frame by transmitting this information on a separate physical channel. The physical channels carrying the data and the control information (e.g., including pilot/reference symbols for channel estimation, power control commands and rate information of the data) can be denoted as physical data channel (PDCH) and physical control channel (PCCH), respectively. Each connection between a mobile station and a base station will be supported by a PCCH and at least one PDCH. The spreading code, symbol rate, or equivalently spreading factor, of the PCCH are known a priori to the receiver. In this way, the receiver can determine the data rate of the PDCH(s) from the PCCH prior to demodulating/decoding the PDCH (s). Exemplary techniques for handling BRI information are described in commonly-assigned, copending U.S. patent application Ser. No. 08/890,794, entitled "Low-Delay Rate Detection for Variable Rate Communication Systems" to Dahlman et al., filed on an even date herewith.

Many potential advantages are attributable to variable rate transmission. For example, interference can be reduced for various users of the system since the chip rate is kept constant and a lower bit rate gives a higher spreading factor, thus allowing a lower transmit power. Those skilled in the art will readily appreciate how this ability to vary the information rate in a CDMA system can be used advantageously to vary other parameters. However, techniques for efficiently allocating spreading codes to the various physical channels (i.e., PCCH and PDCH(s)) are needed and described below.

Figure 1A:
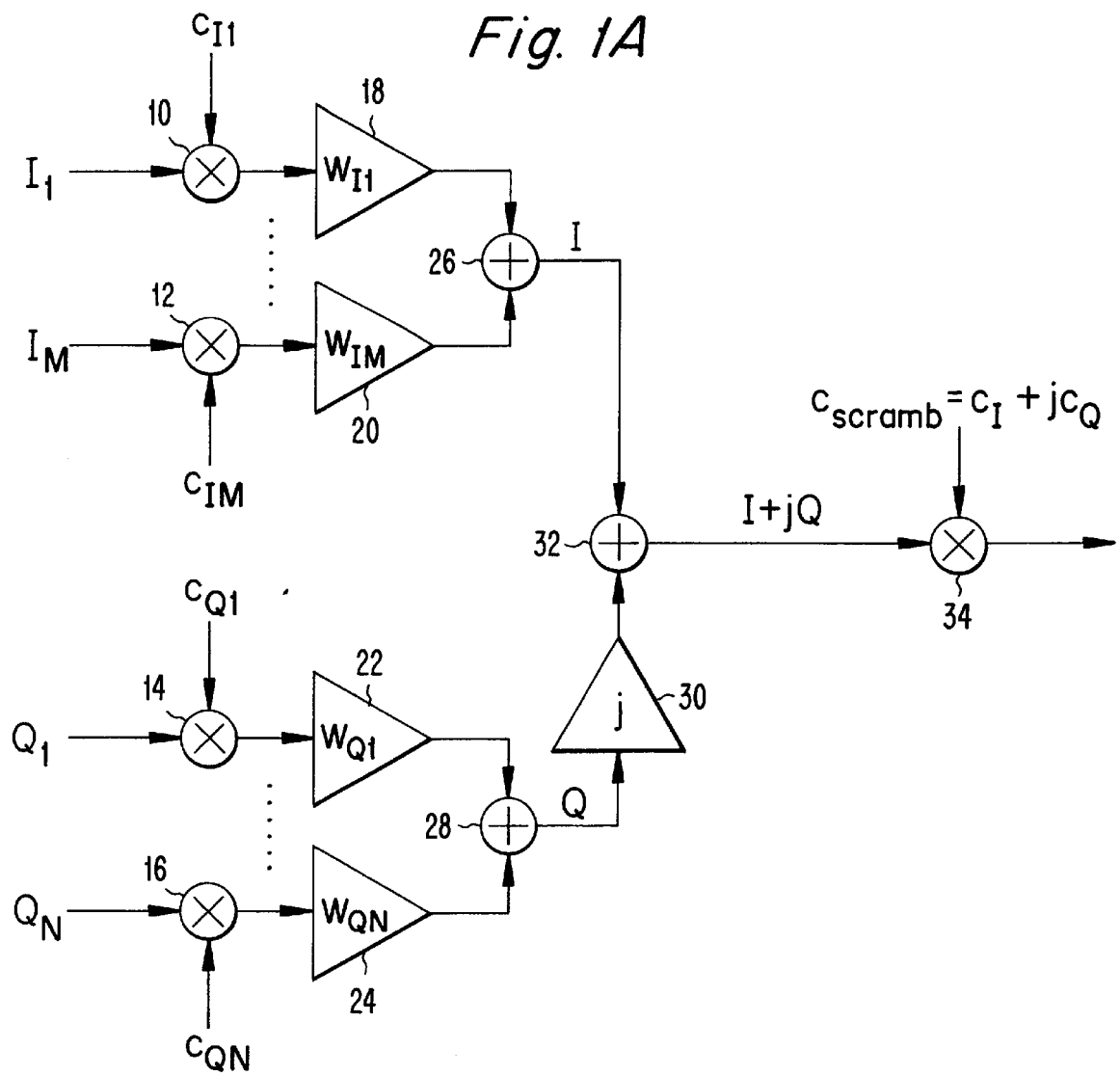
FIG. 1A is a block diagram representation of an exemplary transmitter structure in which the present invention can be implemented.

A physical channel is a bit stream of a certain rate, that is spread using a certain code and allocated to either the in-phase (I) or quadrature (Q) branch in a transmitter. Variable rate services are supported through spreading with a variable spreading factor as described above. A number of data streams are spread to the chip rate using Walsh codes of different length, followed by summation and, if desired, scrambling. The structure of an exemplary transmitter (usable, e.g., in either a base station or a mobile station) which performs these spreading, summing and scrambling operations is illustrated in FIG. 1A.

Figure 1B:
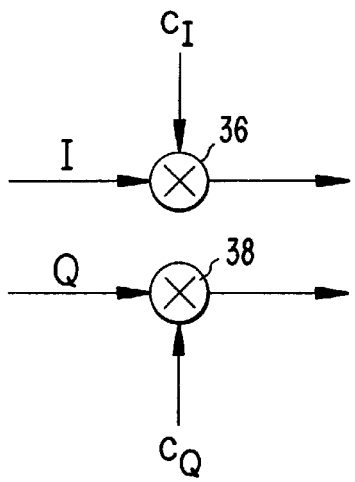
FIG. 1B illustrates an alternative scrambling technique which can be implemented in the transmitter of FIG. 1A.

Therein, a first data stream $I_1$ is supplied to multiplier 10 having a data rate of $R_1$ which is equal to the chip rate $R_c$ divided by the spreading factor $SF_{I1}$ for that data stream. This data stream is spread with a channelization code word $C_{I1}$ having a length of $2^k$ chips which is selected such that the output of multiplier 30 has a chip rate $R_c$ by selecting a value for k that is related to the desired data rate of physical channel $I_1$. For example, a physical channel data rate of 250 kbps is spread to a chip rate of 4 Mcps by using a channelization code of 16 ($2^4$) chips long. More details regarding the allocation of a particular channelization code according to the present invention are described below. Similarly, additional data streams are supplied to multipliers 12, 14 and 16 (and other branches which are unillustrated) to spread their respective data streams with channelization code words having a length which is selected to result in a chip rate $R_c$. The rate of the data streams can be limited to such an interval that the spreading factors used are larger or equal to a predetermined $SF_{min}$. Each physical channel is then weighted by respective amplifiers 18, 20, 22 and 24. The weights can be individually chosen to allocate power to each physical channel so that predetermined quality requirements, e.g., the bit error rate of each physical channel, are satisfied. The physical channels in the "I" branch of the transmitter are summed at summer 26. Similarly, the physical channels in the "Q" branch of the transmitter are summed at summer 28. Scrambling, if desired, is then performed on the superimposed physical channels. This can be done in at least two ways. First, as shown in FIG. 1A, scrambling can be performed by forming the I and Q pairs as a complex number at blocks 30 and 32 and then multiplying the result with another complex number (i.e., the complex valued scrambling code $C_{scramb=cI}$+ $jc_Q$) at block 34. Scrambling can also be performed on the I and Q branches separately as illustrated in FIG. 1B, by multiplying I and Q with two real valued scrambling codes $c_I$ and $c_Q$ at blocks 36 and 38. The scrambling code is clocked at the chip rate. The resultant signal is output, e.g., to transmit signal processing circuitry (e.g. a QPSK or O-QPSK modulator followed by, possibly, pulse-shaping filters), amplified by a transmit power amplifier (not shown) and ultimately coupled to an antenna (also not shown).

Figure 2:
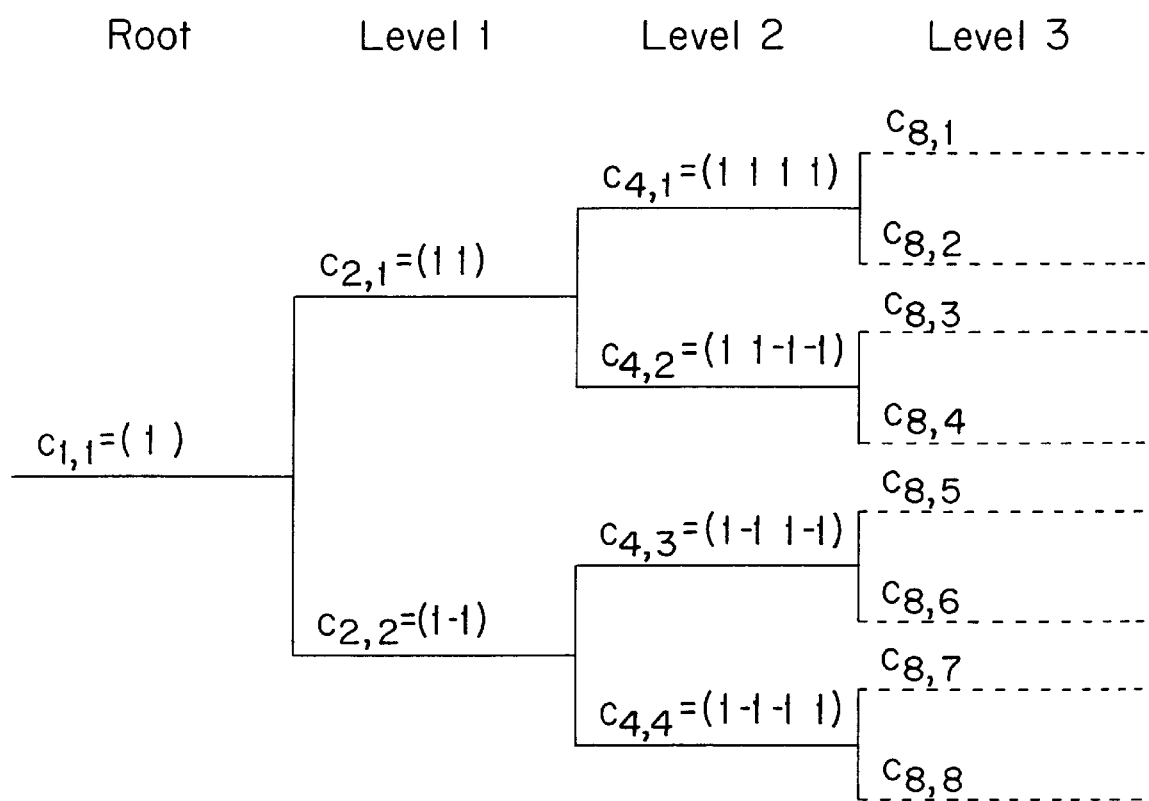
FIG. 2 is an exemplary code tree.

The Walsh codes used for spreading at multipliers 10–16 can be viewed in a tree like manner, as illustrated in FIG. 2. Codes on the same level in the tree are orthogonal and have the same spreading factor. Thus, codes $c_{4,1}$, $C_{4,2}$, $C_{4,3}$ and $C_{4,4}$ are orthogonal codes each of which have the same spreading factor, i.e., the same number of chips. If a physical channel is spread with a first code in the tree, and another physical channel is spread with another code which is (1) not the same as the first code, (2) not to the left of the first code on the path to the root of the tree and (3) not in the subtree which has the first code as the root, then the two spread physical channels will be orthogonal. For example, if the PCCH is allocated code $c_{4,1}$ and a PDCH is allocated code $c_{8,5}$, then these two spread channels would be orthogonal. If, however, the PDCH was allocated code $c_{8,1}$ or $c_{8,2}$, then the PCCH and PDCH would be non-orthogonal. Every physical channel is allocated a spreading code from the tree, with spreading factors matching the respective data rates. As the data rate varies for a particular PDCH, a code from a different level of the tree will be allocated. For example, increasing data rates will cause code selection to move to the left in the tree, while for decreasing data rates code selection will move to the right. Thus, a typical variable rate PDCH will typically move up and down along a certain path in the code tree as its data rate varies. Allocation of physical channels to the I and Q branches of the transmitter, as well as codes from the code tree in FIG. 2 as spreading codes (e.g., $c_{I1}$, $c_{Q1}$, etc. in FIG. 1A) can be made according to the following rules in accordance with the present invention.

Figure 3:
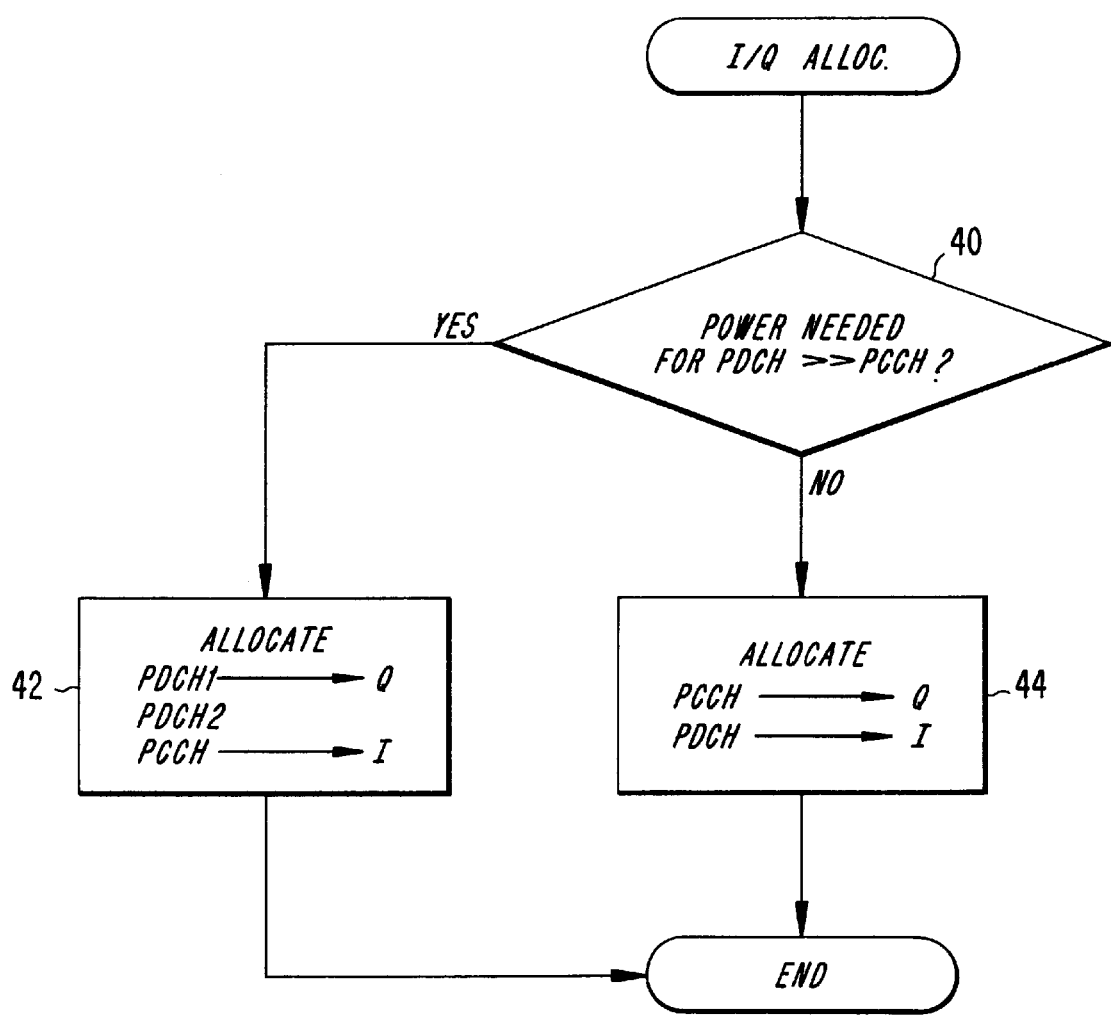
FIG. 3 is a flowchart depicting allocation of physical channels between the I and Q branches of a transmitter according to an exemplary embodiment of the present invention.

FIG. 3 is a flowchart which illustrates an exemplary technique for allocating the physical channels between the I and Q branches of a transmitter according the present invention for the case where a single PDCH can be used (i.e., has sufficient bandwidth) to support a connection. Those skilled in the art will appreciate that this technique provides for a relatively balanced transmit power for the each of the I and Q branches which in turn provides better power amplifier performance. The flow begins at block 40 wherein it is determined whether the power that would be needed to transmit the single PDCH is significantly greater than that needed to transmit the PCCH. For example, if the PDCH is to be transmitted at a much higher rate than the PCCH or if the quality of service (QoS) requirements for the PDCH are higher, then the power requirements will be correspondingly higher. In such a case, the flow proceeds to block 42 wherein the data stream is split into two lower rate PDCHs. The three physical channels can then be allocated, for example, as illustrated in block 42 to the I and Q branches in a manner which will help to more evenly balance the transmit power between these two branches. If, on the other hand, it is determined at block 40 that the PDCH is not to be transmitted at a significantly greater power than the PCCH, then the flow proceeds to block 44 wherein the control channel is allocated to one of the branches and the data channel to the other. Note that the particular selection of Q and I in blocks 42 and 44 is exemplary only and that these designations could of course be reversed.

Figure 4:
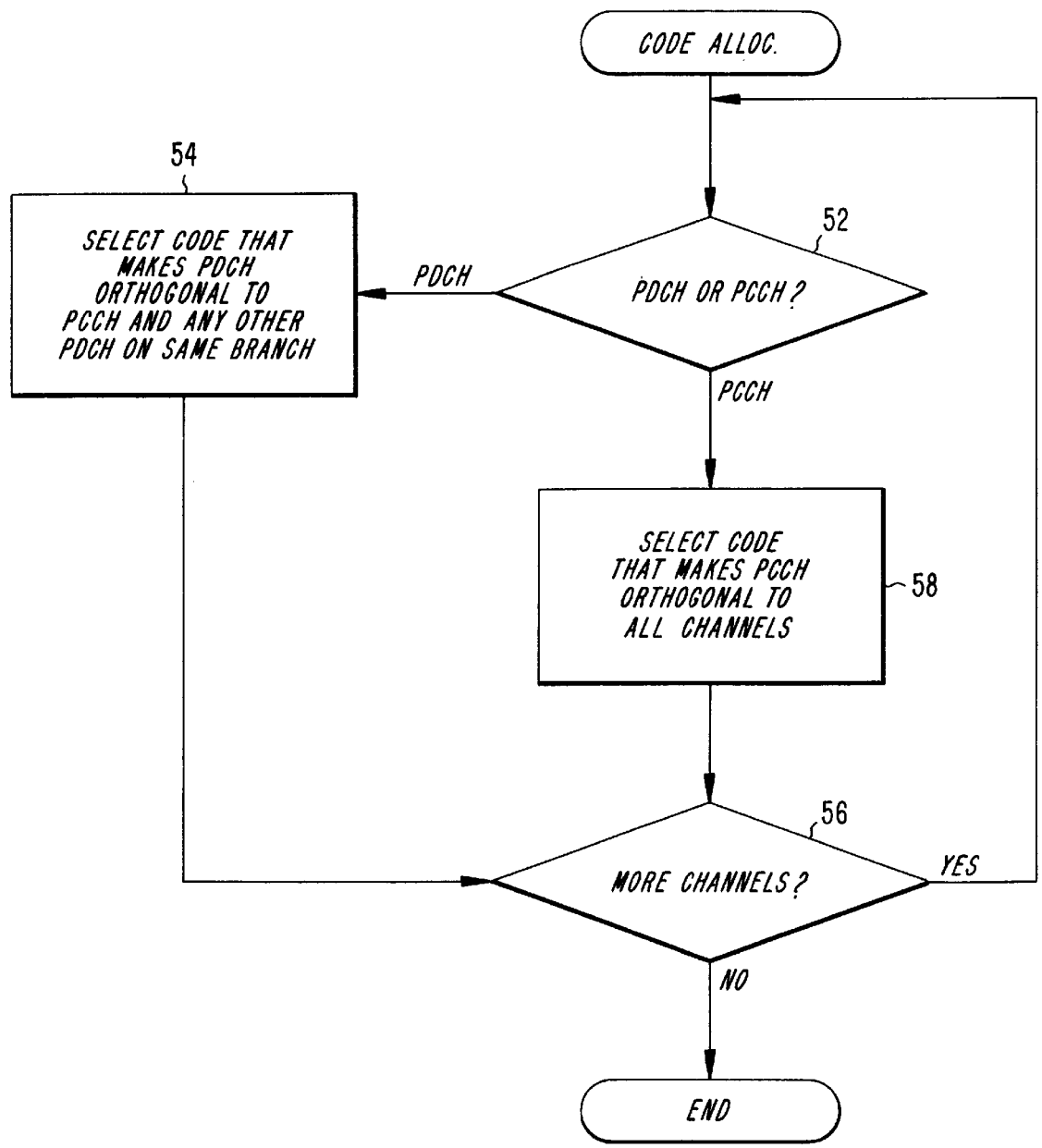
FIG. 4 is a flowchart illustrating the allocation of spreading codes to physical channels according to the present invention.

Having assigned the physical channels to a respective one of the I and Q branches in the transmitter, the next allocation to be made according to the present invention is the selection of a spreading code for each of the physical channels. According to the present invention, the spreading code selected to spread the PCCH should be such that the PCCH is orthogonal to all of the other physical channels to be transmitted in the composite spread spectrum signal, i.e., orthogonal to all channels in both the I and Q branches. This characteristic is desirable because the PCCH must first be demodulated and decoded at the receiver to provide channel estimates which are used to process the data channels transmitted in the same spread spectrum signal. Accordingly, an exemplary technique for allocating spreading codes according to the present invention will now be described with respect to the flowchart of FIG. 4. The flow begins at block 52 wherein it is determined whether the present channel that is being allocated a spreading code is a data channel or a control channel. If the channel currently being allocated a spreading code is a PDCH then the flow proceeds to block 54. Therein, this PDCH is allocated a spreading code which makes the PDCH orthogonal to the PCCH (if the PCCH has already been allocated a spreading code) and which makes the PDCH orthogonal to any other PDCH that is on the same I or Q branch of the transmitter. For example, suppose that at the time this particular PDCH is being allocated a spreading code that the PCCH has already been allocated code $c_{4,1}$ and another PDCH has already been allocated code $C_{8,5}$. Further, assume that this particular PDCH is to be transmitted at a data rate that requires a level 3 code with respect to the code tree of FIG. 2. According to the present invention, this particular PDCH could then be allocated any of codes $c_{8,3}$, $c_{8,4}$, $c_{8,6}$, $c_{8,7}$ and $c_{8,8}$. This PDCH could not be allocated to codes $c_{8,1}$ or $C_{8,2}$ since such allocations would result in non-orthogonality with the control channel. This PDCH could, however, be allocated code $c_{8,5}$ if it is assigned to the opposite transmitter branch of the PDCH which has already been assigned this spreading code.

The flow then proceeds to block 56 whereupon more codes are allocated if additional channels remain. Otherwise the process terminates. If, at block 52, a control channel is being evaluated for spreading code allocation, then the flow proceeds to block 58. Therein, a code is selected which makes the control channel orthogonal to all channels previously allocated codes so that the PCCH can be readily decoded and demodulated at the receiver to provide channel estimates for use and evaluating the data channels.

It will be understood that Applicants' invention is not limited to the particular embodiments described above and that modifications may be made by persons skilled in the art. The scope of Applicants' invention is determined by the following claims, and any and all modifications that fall within that scope are intended to be included therein.

We claim:

1. A transmitter having an in-phase (I) branch and a quadrature (Q) branch for transmitting a composite, spread spectrum signal including at least two physical channels, said transmitter comprising:

means, associated with said I branch, for spreading data associated with one of said at least two physical channels using a first spreading code selected from a code tree having codes that are orthogonal to one another as well as codes that are non-orthogonal to one another to generate a first spread physical channel; and means, associated with said Q branch, for spreading data associated with another of said at least two physical channels using a second spreading code selected from said code tree to generate a second spread physical channel;

wherein said first and second spreading codes have a different number of chips and said first and second spreading codes are selected from said code tree so that said first and second spread physical channels are orthogonal to one another.

2. The transmitter of claim 1, wherein said one of said at least two physical channels is a control channel (PCCH) and said another of said at least two physical channels is a data channel (PDCH).

3. The transmitter of claim 2, further comprising:

means for balancing power associated with said I and Q branches of said transmitter by selectively allocating said at least two physical channels to said I and Q branches based on transmit power requirements.

4. The transmitter of claim 3, wherein said at least two physical channels include a second PDCH which is spread using a third code to generate a third spread physical channel, and wherein said means for balancing power allocates said second PDCH to a same branch of said transmitter as said PCCH to based on said transmit power requirement.

5. The transmitter of claim 4, wherein said second and third spread physical channels are orthogonal.

6. The transmitter of claim 4, wherein said second and third spread physical channels are non-orthogonal.

7. The transmitter of claim 4, wherein said second and third codes are the same codes.

8. A method for allocating spreading codes to a plurality of physical channels to be transmitted in a composite spread spectrum signal in a radio communication system comprising the steps of:

allocating a first spreading code, selected from a code tree having codes that are orthogonal to one another as well as codes that are non-orthogonal to one another, and having a first number of chips to a control channel so that said control channel is orthogonal to others of said plurality of physical channels in said composite spread spectrum signal; and allocating a second spreading code having a second number of chips different from said first number of chips to a first data channel, which second spreading code is selected from said code tree such that said control channel and said first data channel are orthogonal to one another.

9. The method of claim 8, wherein said control channel conveys reference information usable to make channel estimates.

10. The method of claim 8 further comprising the step of:

allocating a third spreading code having a third bit length to a second data channel, said third spreading code selected such that said control channel and said second data channel are orthogonal to one another.

11. The method of claim 10, wherein said first and second data channels are orthogonal.

12. The method of claim 10, wherein said first and second data channels are non-orthogonal.

13. The method of claim 10, wherein said second and third spreading codes are the same codes.

14. The method of claim 10, further comprising the steps of:

assigning said second data channel to one of an I and a Q branch in a transmitter; and assigning said third data channel to the other of said I and Q branches.

15. The transmitter of claim 1, further comprising:

means for scrambling said first and second spread physical channels of said I and Q branches.

16. A method for allocating spreading codes to a plurality of physical channels to be transmitted in a composite spread spectrum signal in a radio communication system comprising the steps of:

allocating a first spreading code, selected from a code tree having codes that are orthogonal to one another as well as codes that are non-orthogonal to one another, and having a first number of chips to a first data channel; and allocating a second spreading code having a second number of chips different from said first number of chips to a control data channel, which second spreading code is selected from said code tree such that said control channel and said first data channel are orthogonal to one another.

17. The method of claim 16, wherein said control channel conveys reference information usable to make channel estimates.

18. The method of claim 16 further comprising the step of:

allocating a third spreading code having a third bit length to a second data channel, said third spreading code selected such that said control channel and said second data channel are orthogonal to one another.

19. The method of claim 18, wherein said first and second data channels are orthogonal.

20. The method of claim 18, wherein said first and second data channels are non-orthogonal.

21. The method of claim 18, wherein said second and third spreading codes are the same codes.

22. The method of claim 18, further comprising the steps of:

assigning said second data channel to one of an I and a Q branch in a transmitter; and assigning said third data channel to the other of said I and Q branches.

* * * * *